(12) United States Patent
Esslinger

(10) Patent No.: US 10,835,962 B2
(45) Date of Patent: Nov. 17, 2020

(54) DISENGAGEMENT MECHANISM FOR BORING BAR APPARATUS

(71) Applicant: Bore Repair Systems, Inc., Alstead, NH (US)

(72) Inventor: Thomas Esslinger, Langdon, NH (US)

(73) Assignee: BORE REPAIR SYSTEMS, INC., Alstead, NH (US)

( * ) Notice: Subject to any disclaimer, the term of this patent is extended or adjusted under 35 U.S.C. 154(b) by 0 days.

(21) Appl. No.: 16/294,245

(22) Filed: Mar. 6, 2019

(65) Prior Publication Data
US 2019/0275592 A1   Sep. 12, 2019

Related U.S. Application Data

(60) Provisional application No. 62/640,833, filed on Mar. 9, 2018.

(51) Int. Cl.
*B23B 29/02*   (2006.01)

(52) U.S. Cl.
CPC .................................... *B23B 29/02* (2013.01)

(58) Field of Classification Search
CPC ..... B23B 45/008; B23B 45/001; B23B 29/02; B23B 29/03; B23B 29/034; B23B 29/03425; B23B 29/03407; B23B 29/03435; B23B 29/03439; B23B 29/03467; B23Q 5/326; B25F 5/001
See application file for complete search history.

(56) References Cited

U.S. PATENT DOCUMENTS

| | | | | | |
|---|---|---|---|---|---|
| 4,480,700 A | * | 11/1984 | Krieger | ................... | B23B 41/00 173/145 |
| 5,205,681 A | * | 4/1993 | Eckman | ................. | B23Q 5/326 408/1 R |
| 5,642,969 A | * | 7/1997 | Strait | ...................... | B23B 29/02 408/124 |
| 7,770,498 B2 | * | 8/2010 | Sorensen | .............. | B23B 29/022 408/181 |
| 8,696,265 B2 | * | 4/2014 | Elsmark | ................. | B23Q 5/326 173/217 |
| 2007/0209813 A1 | * | 9/2007 | Veres | ...................... | B23B 47/34 173/4 |
| 2008/0260485 A1 | * | 10/2008 | Jaillon | .................. | B23B 35/005 409/232 |

(Continued)

*Primary Examiner* — Nicole N Ramos
(74) *Attorney, Agent, or Firm* — Davis & Bujold PLLC; Michael J. Bujold

(57) ABSTRACT

A boring bar apparatus comprising a boring bar having at least one tool aperture formed therein. An axial translation mechanism for axially indexing the boring bar. The axial translation mechanism comprises a feed screw assembly having a threaded section, a rotational converter mechanism coupling the boring bar to the feed screw assembly for incrementally rotating the feed screw assembly, and a feed coupling having a first end engaging with the feed screw assembly and a second end engaging with the boring bar. The first end of the feed coupling having a threaded half nut section which, in a first position, engages with the feed screw assembly to facilitate axially indexing of the boring bar, and, in a second position, disengages from the feed screw assembly to facilitate moving both the feed coupling and the boring bar relative to the feed screw assembly to assist with repositioning of the boring bar.

19 Claims, 8 Drawing Sheets

(56) References Cited

U.S. PATENT DOCUMENTS

| | | | |
|---|---|---|---|
| 2010/0189522 A1* | 7/2010 | Esslinger | B23B 29/02 408/129 |
| 2011/0131781 A1* | 6/2011 | Smith | B23B 29/02 29/281.1 |
| 2014/0318290 A1* | 10/2014 | Eriksson | B23Q 5/326 74/89.23 |
| 2015/0375306 A1* | 12/2015 | Jallageas | B23Q 5/402 408/67 |
| 2019/0134718 A1* | 5/2019 | Stafflage | B23B 45/008 |

* cited by examiner

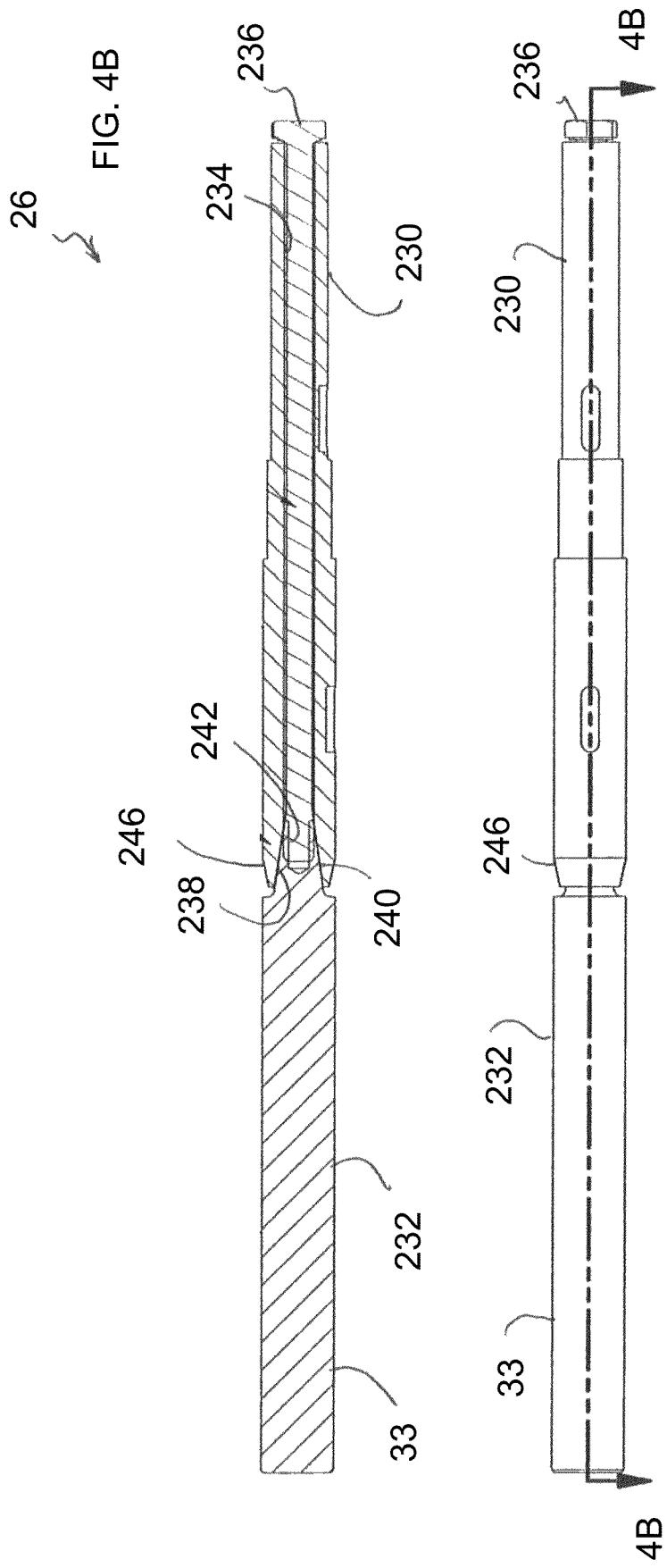

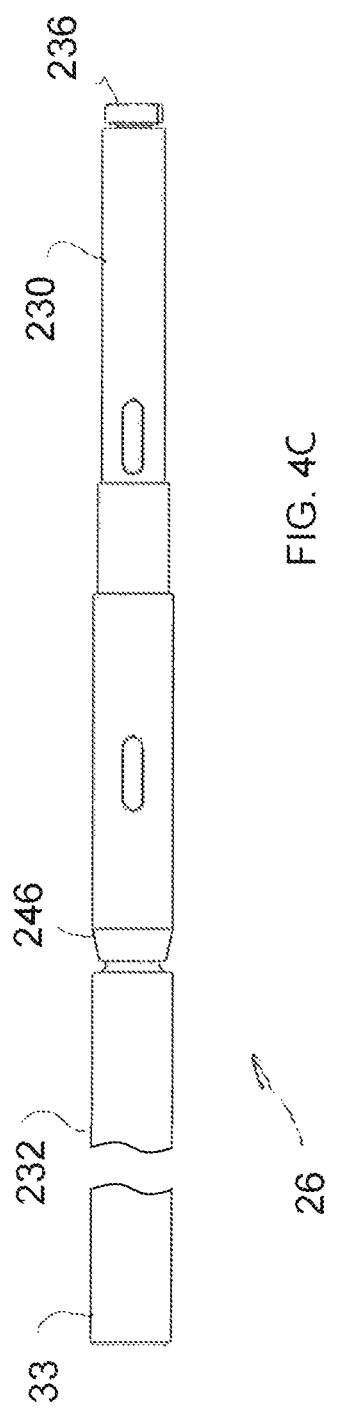

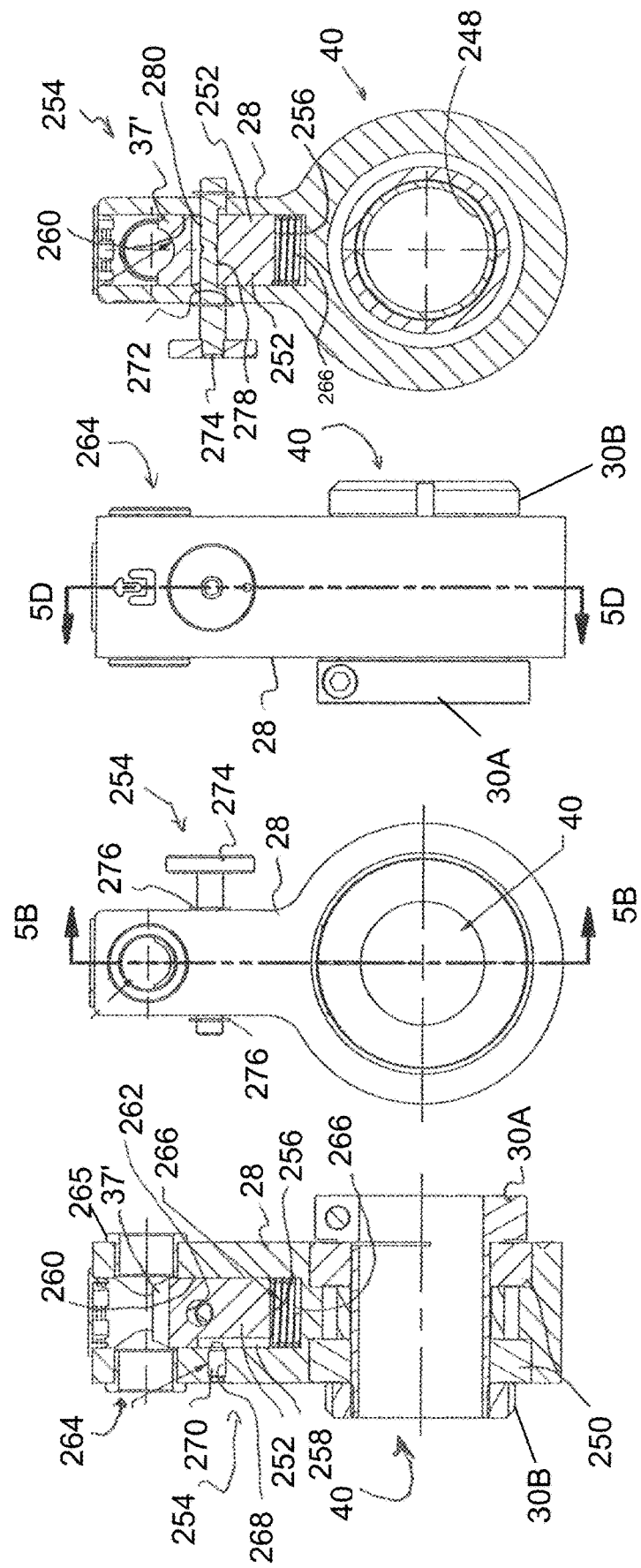

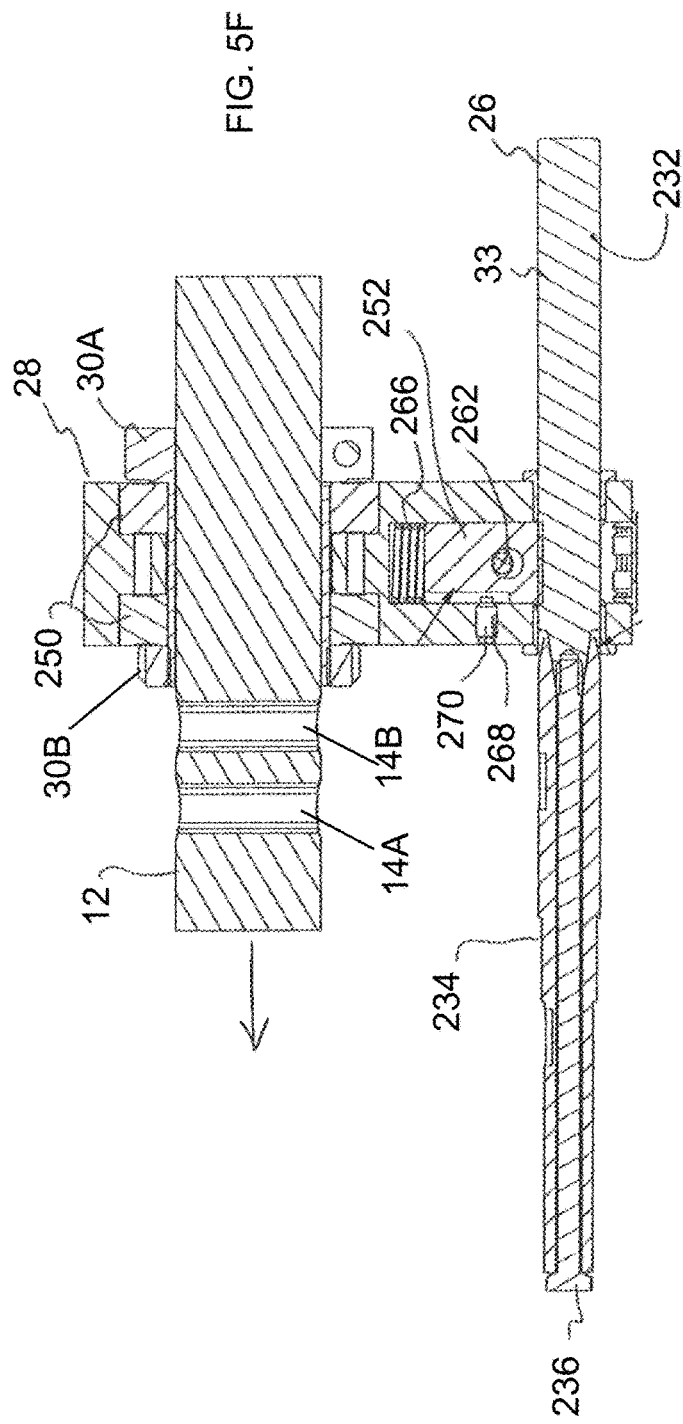
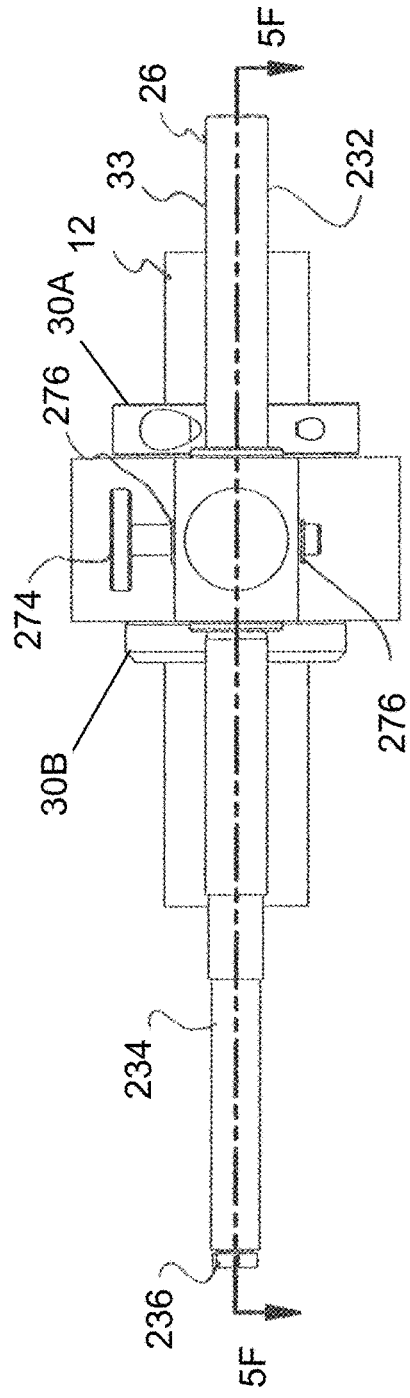

DISENGAGEMENT MECHANISM FOR BORING BAR APPARATUS

FIELD OF THE INVENTION

The present invention relates to a number of improvement relating to various components of a boring bar apparatus.

BACKGROUND OF THE INVENTION

Heavy equipment and machinery frequently require repair and it is generally preferable that such repair be done in the field rather than transporting such machinery or equipment to a suitable repair facility, since this reduces the associated time and cost required for repair. One of the most commonly required repairs for large machinery or equipment is the repair or refurbishing of a bore, that is, a circular opening that supports an axle or a shaft, for example, as these circular openings eventually become damaged or worn due to a variety of reasons, including mechanical wear of the parts, thereby resulting in a need to restructure or reconstruct the bore to the proper diameter and shape. It may also be desirable to modify a bore for a number of reasons, such as reconstructing the bore to have a slightly larger or smaller diameter to accommodate a different sized shaft or axle.

The repair of a damaged or worn bore or the modification of a bore, for any reason, typically involves first rebuilding the interior surface of the bore by deposition of a metal, typically by a welding or a flame deposition process, and then subsequently boring and machining of the rebuilt surface to reduce the rebuilt surface down to the precisely required internal diameter. These operations are typically performed in the field by a portable boring machine which has a boring bar that is inserted into the bore to be repaired. The boring bar is typically supported on bearings, located on each side of the bore being repaired, and typically supports one or more exchangeable tools for repairing/refurbishing the bore, such as a welding head and a variety of cutting or machining tools for subsequent machining of the surface of the bore being repaired.

The arrangement of the boring bar, supporting one or more bore repair tools and supported at each opposed end thereof by bearings, provides radial support and rigidity for the cutting or machining tool that is necessary for accurate reconstruction of the bore, but also presents other problems and shortcomings. For example, and in particular, the accurate reconstruction of a bore requires the accurate guidance of the mounted bore repair tool or tools through the bore to achieve the desired bore diameter and alignment as well as the desired machined finish for the interior surface of the bore.

The present invention provides a variety of unique solutions to these and other related problems associated with prior art boring machines and equipment as well as feeding of the boring bar during repair of a desired bore.

SUMMARY OF THE INVENTION

Wherefore, it is an object of the present disclosure is to overcome the above mentioned shortcomings and drawbacks associated with currently available boring machines and equipment as well as feeding of the boring bar relative to the bore being repaired.

It is an object of the present disclosure to facilitate joining two or more boring bars together with one another, in an end to end relationship, in a secure fashion in which the outer diameter of the boring bar remains the same diameter and thus is unaffected.

Another object of the present disclosure is to facilitate joining of a first boring bar and a second boring bar with one another, in an end to end relationship and in a secure fashion, such that about one half of an intermediate coupling member is received within each adjacent end of the first and second boring bars so at to form an elongate boring bar which has a desired axial length.

It is a further object of the present disclosure is to quickly and easily altering the overall length of the feed screw assembly by forming the feed screw assembly as two separate shafts which can be readily connected and disconnected to one another by a draw bolt. The feed screw support shaft is designed to remain engaged with the boring bar mechanism and while the feed screw shaft is designed to be interchangeable so that the distance that the feed screw assembly can convey the boring bar can be readily altered, changed or modified by merely replacing a first feed screw shaft with a second, e.g., longer or short, feed screw shaft.

Yet another object of the present disclosure is to provide the feed screw assembly with a drive interrupt, formed at the interface between the feed screw support shaft and the feed screw shaft, which prevents further feeding of the boring bar.

A further object of the present disclosure is to provide a thread engagement/disengagement mechanism which releasably engages and disengages with the threaded section of the feed screw shaft so that, when the thread engagement/disengagement mechanism is in its engaged position, the elongate half nut component engages with the threaded section of the feed screw assembly to axially move the feed coupling during rotation of the feed screw assembly, but when the thread engagement/disengagement mechanism is disengaged from the threaded section, the feed coupling as well as the connected boring bar can both be moved or slid, by an operator, axially along the feed screw assembly to a new desired relative position thereby avoiding either the need to actuate the drive motor or to rotate manually the feed screw in order to reposition the feed coupling and the connected boring bar to a desired location for another machining or cutting pass.

BRIEF DESCRIPTION OF THE DRAWINGS

The accompanying drawings, which are incorporated in and constitute part of the specification, illustrate various embodiments of the invention and together with the general description of the invention given above and the detailed description of the drawings given below, serve to explain the principles of the invention. The invention will now be described, by way of example, with reference to the accompanying drawings in which:

FIG. 2C is a diagrammatic cross sectional view, along section line 2D-2D of FIG. 2C, showing the first and the second boring bars connected to one another via the coupling member;

FIG. 4A is a perspective view of a feed screw assembly, according to the disclosure, having a feed screw support shaft which is releasably connected with a feed screw shaft;

FIG. 4B is a diagrammatic cross sectional view of the feed screw assembly along section line 4B-4B of FIG. 4A;

FIG. 4C is a perspective view of a feed screw assembly showing a feed screw shaft that can be either longer or shorter than the feed screw shaft shown in FIG. 4A;

FIG. 5A is a front elevational view of the improved feed coupling according to the disclosure;

FIG. 5B is a diagrammatic cross sectional view of the improved feed coupling along section line 5B-5B of FIG. 5A;

FIG. 5C is a right side elevational view of the improved feed coupling of FIG. 5A;

FIG. 5D is a diagrammatic cross sectional view of the improved feed coupling along section line 5D-5D of FIG. 5C;

FIG. 5E is a diagrammatic top plan view of the improved feed coupling diagrammatically shown coupled to both a boring bar and a feed screw assembly; and FIG. 5F is a diagrammatic cross sectional view of the improved feed coupling along section line 5F-5F of FIG. 5E.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit in any way, the scope of the present invention.

Figure 1:
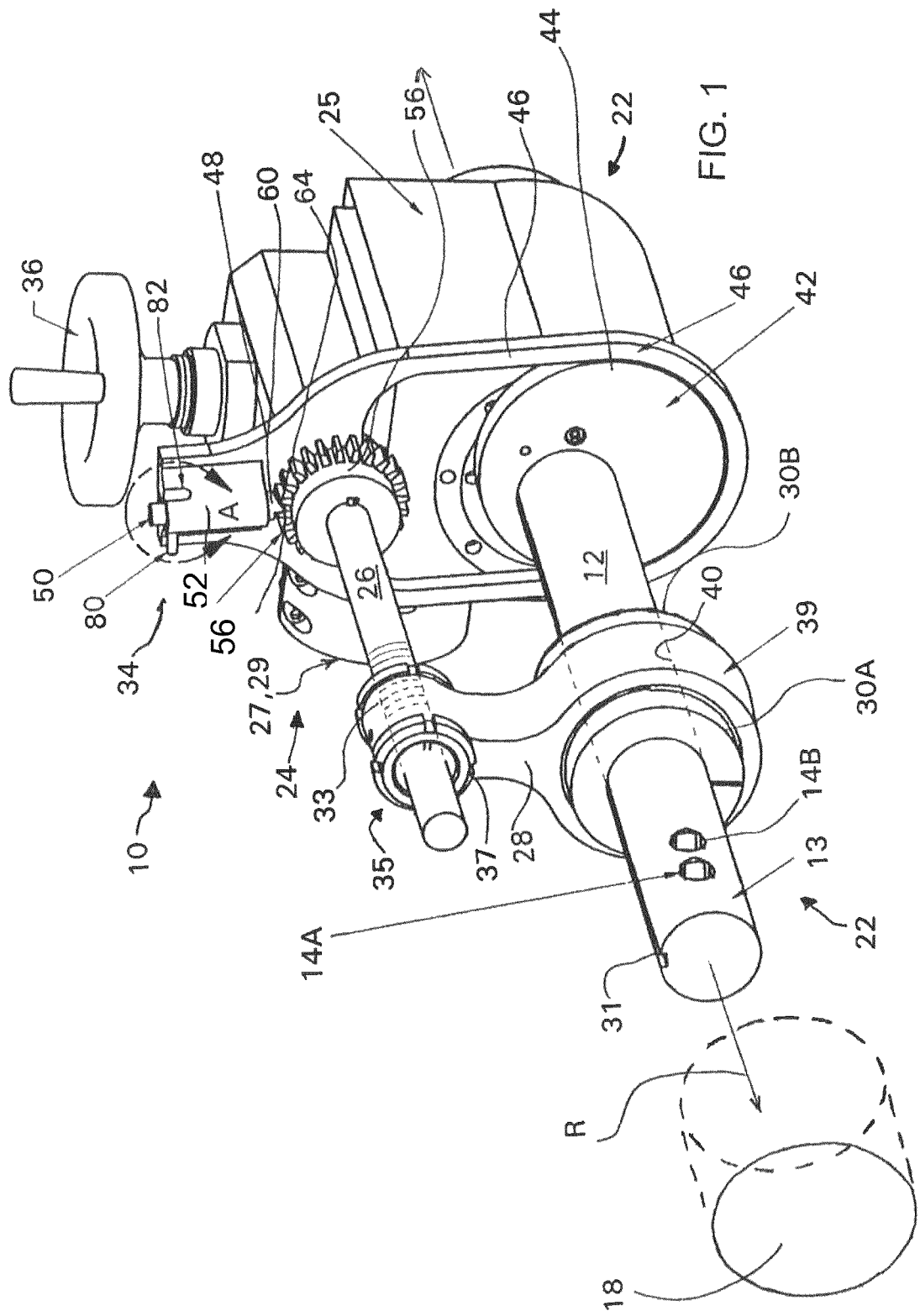
FIG. 1 is a diagrammatic perspective view showing various components of the boring bar mechanism according to the present disclosure.

Turning now to FIG. 1, a diagrammatic representation of an exemplary boring bar mechanism 10, according to the present disclosure, is shown. As illustrated in FIG. 1, the boring bar mechanism 10 includes a rotatable and axially translatable cylindrical boring bar 12 typically having at least one and more commonly two spaced apart tool apertures or holders 14A, 14B located adjacent a working end 13 of the boring bar 12 for mounting various tools, such as a variety of cutting, milling, machining or finishing tools (not shown), for preforming a desired cutting, milling, machining or finishing operation within a bore 18 being repaired or refurbished (only diagrammatically shown). As is well understood by those of ordinary skill in the relevant art, the operations which are preformed within or the interior surface on the bore 18, by the boring bar mechanism 10, typically requires the concurrent rotation as well as axial translation of the boring bar 12, and thus of the tool(s) mounted or supported by the tool holders 14A, 14B operates on successive axial sections of the bore 18. For this reason, the boring bar mechanism 10 will further include a boring bar rotation mechanism 22 for rotating the boring bar 12 as well as an axial translation mechanism 24 for incrementally axially moving the boring bar 12, in the axial direction, as the boring bar 12 rotates.

First considering the rotation mechanism 22, the boring bar 12 and thus the tool(s) mounted on the tool holder 14A or 14B are rotationally driven by a conventional gearbox 25 which, in turn, is driven by a conventional motor or some other drive mechanism 27 coupled to the gearbox 25, typically through a drive attachment coupling 29, both of which are well known in the art and thus only diagrammatically shown in FIG. 1. The gearing of the gearbox 25 is typically coupled to the boring bar 12 to selectively rotate the boring bar 12 in either a clockwise or a counterclockwise rotational direction while allowing free axial translation of the boring bar 12, by means of an elongated axial keyway 31, formed in an exterior surface of the boring bar 12, and a corresponding key (not shown) that is coupled to associated gearing of the gearbox 25 to facilitate rotational driving of the boring bar 12. As such mechanisms for engaging the gearbox 25 with the boring bar 12, for rotationally driving the boring bar 12 while still allowing axial movement of the boring bar 12, are well known and commonly used in the relevant art, such features of the rotation mechanism 22 need not be, and are not, described in any further detail herein.

According to one embodiment of the boring bar mechanism 10, the boring bar 12 may typically have a diameter in the range of about 1 inch to about 3 inches and achieves axial movement in the range of about ½ inch to about 36 inches or more, and is generally rotated at an operational speed of between ½ and 300 revolutions per minute. It will be understood that the diameter, the axial movement range and the rotational speed range of the boring bar 12 will be determined by such factors as, for example, the size of the bore 18 being repaired or refurbished, the thickness and material(s) of the structural element located within the bore 18, the type of tool or tools which are mounted to the tool mountings 14A or 14B, the cutting, milling, machining or finishing operation to be performed, and so forth. It will also be recognized that modifications and adaptations of the boring bar mechanism 10 to accommodate such factors will be well understood by those of ordinary skill in the art.

Next considering the axial translation mechanism 24, as described above, the boring bar 12 is gradually moved or indexed, in the axial direction, a small incremental distance along the rotational axis of the bore 18, as the boring bar 12 and thus the tool(s) is rotated within the bore 18 being repaired or refurbished. As a result of this, the selected operation, to be performed by the tool or tools, is gradually performed on the interior surface of the bore 18 along the desired entire axial length of the bore 18 being repaired or refurbished. According to typical embodiments of the boring bar mechanism 10, the boring bar 12 is axially indexed at some point during each rotation of the boring bar 12, typically when the boring bar 12 either begins or completes a full rotation but may, alternatively, in certain applications may be axially indexed following either multiple rotations or a partial rotation of the boring bar 12.

As illustrated in FIG. 1, the automatic axial translation mechanism 24, for facilitating automatic axial translation of the boring bar 12 during rotation of the boring bar 12, includes a feed screw assembly 26 which extends parallel to but is spaced apart from boring bar 12 and the feed screw assembly 26 has a threaded section 33 located along the exposed end of the feed screw assembly 26, generally adjacent the end of boring bar 12 supporting the tool holders 14A, 14B. The threaded section 33 extends over at least an axial length of the exposed feed screw assembly 26 that corresponds to the intended axial range of motion of the boring bar 12, typically between at least an inch or so to up to about 36 inches or so, e.g., typically a major portion of the length of the feed screw assembly 26 is threaded.

As shown, the threaded section 33 of the feed screw assembly 26 is coupled to the boring bar 12 by a feed coupling 28, which extends generally perpendicular to the feed screw assembly 26 and interconnects the boring bar 12 with the feed screw assembly 26. The feed coupling 28 operates, during rotation of the feed screw assembly 26 in a corresponding rotational direction, to convey incrementally the boring bar 12 axially, in either axial direction, along the axis R of the boring bar 12. It will be appreciated that while the feed coupling 28 may be axially movable along the axes of both the feed screw assembly 26 and the boring bar 12, the feed coupling 28 does not rotate with respect to either of the feed screw assembly 26 or the boring bar 12 because opposed the ends of the feed coupling 28 are respectively coupled, as shown in FIG. 1 and as described below, to both the feed screw assembly 26 and the boring bar 12.

The feed screw assembly 26 has a diameter between about ¼ to about 3 inches, more preferably a diameter of between about ½ to about 1¼ inches or so, and most preferably a diameter of about ¾ of an inch and the threaded section 33 typically has a screw thread of between 4 and 40 threads per inch or so. As noted above, a majority of, if not, the entire axial length of the exterior surface of the feed screw assembly 26 is typically threaded. It will be understood, however, that the diameter and the incremental angular rotational range and the thread pitch of the feed screw assembly 26 and the threaded section 33 will be determined by such factors as, for example, the size of the bore 18 to be repair or refurbished, the thickness and material of the structural element located within the bore 18, the tool(s) mounted to the tool mountings 14A, 14B, the cutting, milling, machining or finishing operation being performed, and so forth. It will also be recognized that modifications and adaptations of the boring bar mechanism 10 to accommodate such factors as well as other factors will be apparent and well understood by those of ordinary skill in the art.

Turning now to the coupling between the feed coupling 28 and the threaded section 33 of the feed screw assembly 26, as diagrammatically illustrated in FIG. 1 for example, a threaded coupler 37 of the feed coupling 28 threadedly engages with the threaded section 33 of the feed screw assembly 26. The threaded coupler 37 is axially located within the first end 35 of the feed coupling 28 so that the first end 35, and thereby the feed coupling 28, is driven in the axial direction along the feed screw assembly 26 and thereby also in the axial direction with respect to the boring bar 12, as the feed screw assembly 26 rotates relative to the feed coupling 28. It will be appreciated that this function may be accomplished by a number of other possible configurations of the threaded coupler 37. For example, the threaded coupler 37 may have a generally polygon or polyangular outer circumference, similar to a hex-nut, and thereby rotationally and axially fitted into a correspondingly shaped cavity in the first end 35 of the feed coupling 28 and axially retained therein by, for example, a retaining cap, a washer fitting, a set screw, etc. Alternately, and again by way of example, the threaded coupler 37 may have a circular or polyangular outer circumference and may be axially and rotationally fixed into a circular or a circular cavity in the first end 35 of the feed coupling 28 by a set screw or a key locking bolt engaging both the threaded coupler 37 and the first end 35 of the feed coupling 28.

Turning now to the coupling between a second end 39 of the feed coupling 28 and the boring bar 12, as shown in FIG. 1, the second end 39 of the feed coupling 28 has a coupling bore 40. The coupling bore 40 extends completely through the second end 39 of the feed coupling 28 and is suitable sized to closely receive and accommodate the boring bar 12. This arrangement allows the boring bar 12 to extend completely through the second end 39 of the feed coupling 28 and rotate within the coupling bore 40. For this purpose, the coupling bore 40 may include an internal bearing (not shown), located between an interior surface of the coupling bore 40 and the exterior surface of the boring bar 12, to facilitate relative rotation between the boring bar 12 and the feed coupling 28.

A split locking collar 30A with an integral-split sleeve and a spanner nut 303 assist with spacing the internal bearings of the feed coupling 28 from the boring bar 12 while facilitating relative rotation therebetween. The end of the split sleeve, opposite the split locking collar 30A, has a threaded section which threadedly engages with the spanner nut 30B to form a releasable connection therebetween. During use, the split locking collar 30A and the integral split sleeve are first clamped, in a conventional manner, to the boring bar 12 at a desired location. Then the feed coupling 28 is positioned so that a first side of the feed coupling 28 abuts against the split locking collar 30A while the internal bear(s) are located to engage and rotate around the exterior circumference of the split sleeve. Thereafter, the spanner nut 303 threadedly engages with the threaded section of the split sleeve. As the spanner nut 303 is gradually tightened relative to the threaded section of the split sleeve, the spanner nut 303 eventually abuts against a second side of the feed coupling 28 to sandwich the feed coupling 28 between the split locking collar 30A and the spanner nut 30B, with a small amount of play being provided therebetween. As a result of this arrangement, when the feed coupling 28 is axially moved or driven in either axially direction, due to rotation of the feed screw assembly 26, the feed coupling 28 is axially moved in one direction or the other and either abuts against the split locking collar 30A or the spanner nut 303. Such movement of the feed coupling 28, in turn, causes the locking collar 30A/split sleeve/spanner nut 303 and clamped boring bar 12 to move axially in the same direction as the feed coupling 28. The axial movement of the first end 35 of the feed coupling 28, caused by rotation of the threaded section 33 of the feed screw assembly 26, acts upon the threaded coupler 37 and thereby results in axial movement of the second end 39 of the feed coupling 28. Such in axial movement of the second end 39 thereby causes a corresponding axial movement of the locking collar 30A/split sleeve/spanner nut 30B and clamped boring bar 12 as well as the tool(s) mounted to the tool mounting 14A or 14B.

As is apparent from the above, the boring bar 12, and thus the associated tool(s), are rotated in either rotational direction within the bore 18 being repaired or refurbished by the drive mechanism 27 acting through the gearbox 25 while the boring bar 12, and the tool(s), are axially moved in desired axial direction, within the bore 18, by axial movement of the feed coupling 28 which is caused by the rotation of the threaded section 33 of the feed screw assembly 26, which is translated by the threaded coupler 37 into either an advancing or a withdrawing axial motion of the feed coupling 28, and thus the boring bar 12, relative to the bore 18 being repaired or refurbished.

As described, the feed screw assembly 26, and thus the threaded section 33, are rotated by an incremental amount to axially advance or withdraw the boring bar 12 and the tool(s), relative to the bore 18 being repaired or refurbished, by a corresponding incremental amount during each partial or complete rotation of the boring bar 12 by the drive mechanism 27 acting through the gearbox 25. According to one embodiment, the feed screw assembly 26 is rotated between about 5 degrees and about 60 degrees, and more preferably between about 10 degrees and about 45 degrees, each time the boring bar 12 completes a single rotation.

The boring bar 12 is coupled to and drives the feed screw assembly 26, to incrementally rotate the feed screw assembly 26 selectively in either direction during rotation of the boring bar 12, by a cam mechanism and a rotational converter mechanism 34, as generally illustrated in FIG. 1. As diagrammatically shown therein, the cam mechanism includes an eccentric cam 42 which is coupled to the boring bar 12 so as to rotate with the boring bar 12 as the boring bar 12 rotates but still remain closely adjacent the boring bar rotation mechanism 22. A cam follower 46, having a cam opening 44 formed centrally therein, is rotationally mounted to the feed screw assembly feed screw assembly 26. During operation of the boring bar 12, the cam follower 46 oscillates backward and forward, relative to the feed screw assembly 26, as the cam 42 is rotated due to rotation of the boring bar 12.

The cam follower 46 is coupled to the feed screw assembly 26, via the rotational converter mechanism 34 which is mounted to and supported by an upward extension 48 of the cam follower 46, so that such oscillatory motion of the cam follower 46, about the feed screw assembly 26, is transformed, by the rotational converter mechanism 34, into rotational or rotary motion of the feed screw assembly 26.

A conventional converter gear 56, which has a relatively coarse gear ratio, e.g., a total of 18 gear teeth provided about the circumference of the converter gear 56 so that generally only one tooth is indexed each time the cam follower 46 oscillates back and forth. It is to be appreciated that it is possible for the converter gear 56, to also have a relatively fine gear ratio, e.g., a total of 48 gear teeth provided about the exterior circumference of the converter gear 56. It is to be appreciated that the converter gear 56 may have, depending upon the particular application, between 18 and 64 teeth. The additional teeth as well as the closer spacing between the teeth 57 allow adjustment of the pivot of the waddle mechanism so that one, or possibly two teeth, may be indexed each time the cam follower 46 oscillates back and forth.

Figure 2C:
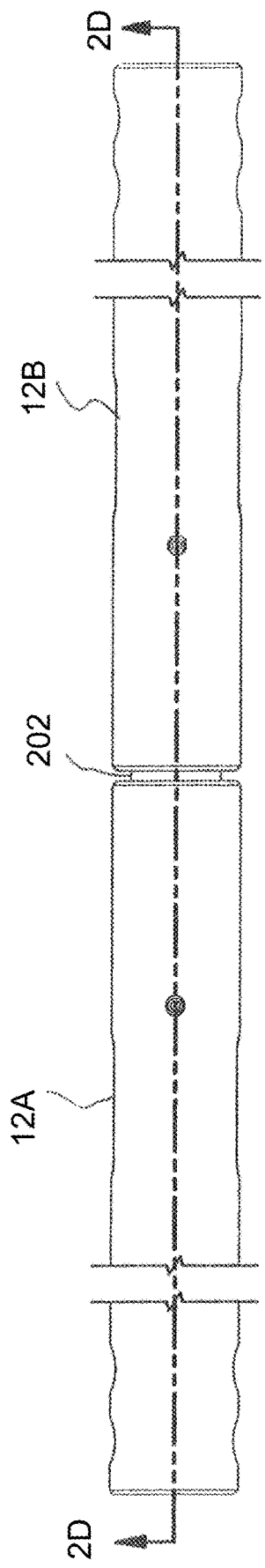
FIG. 2C is a diagrammatic front elevational view showing first and second boring bars, according to the disclosure, connected to one another via the coupling member of FIG. 2A.
Figure 2D:
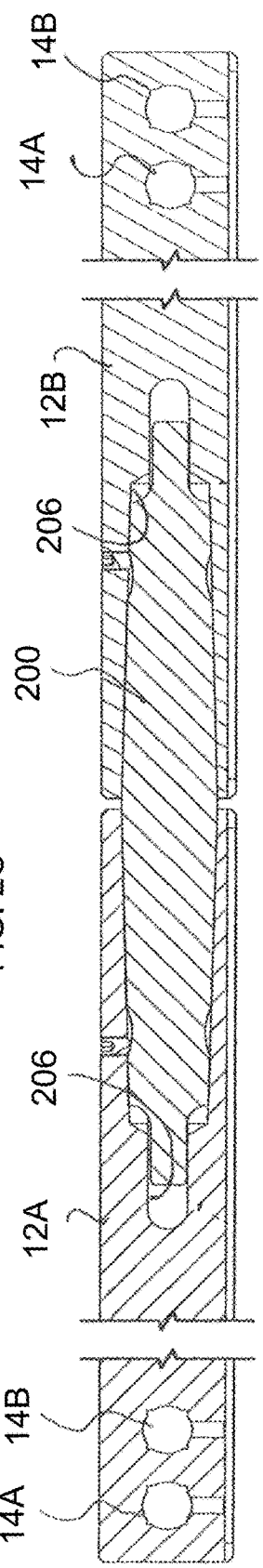
FIG. 2A is a diagrammatic front elevational view of the coupling member.
FIG. 2B is a diagrammatic top plan view of the coupling member of FIG. 2A.
Figure 2A:
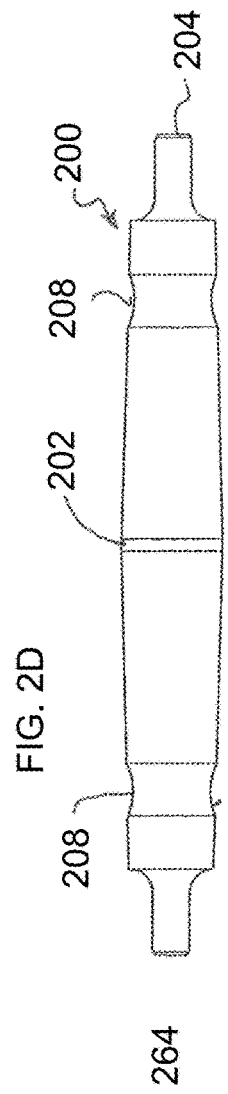
Figure 2B:
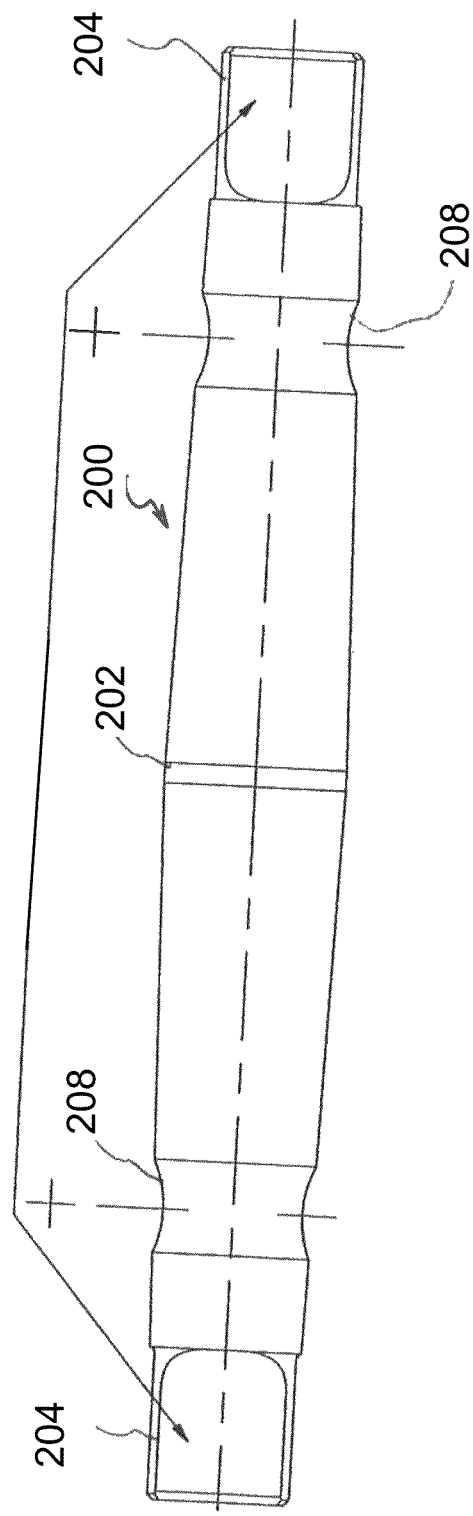

Turning now to FIGS. 2A. 2B, 2C and 2D, a detailed description concerning a first aspect of the present disclosure will now be provided. According to this embodiment, a coupling member 200 is provided for joining first and second boring bars 12A, 12B together with one another, in end to end relationship of arrangement, to form an elongate boring bar 12 having a desired axial length. As shown, the coupling member 200 typically has length of about 10.0 inches and a largest dimension at its central midpoint section 202. The midpoint section 202 has a diameter of about 1.231+0.001 inches and an axially length of about 0.140 inches. The coupling member 200 has a gradually taper, e.g., a #4 Morse Taper, provided on either side of the midpoint section 202 toward each oppose end thereof to a slightly smaller transverse cylindrical dimension, e.g., a diameter of 1.027+0.001 inches. Each one of the gradual tapers has an axially length of about 3.880, for example. A tang 204, having a generally rectangular cross-sectional shape, is located at each opposed end of the coupling member 200, and the purpose of the tang 204 is to prevent relative rotation between the coupling member 200 and the mating first or second boring bar(s) 12A or 12B, when the coupling member 200 is received by and within a blind cavity or recess 206 formed an each opposed end of the respective boring bar 12A, 12B, as will be described below in further detail. The tang 204 has an axial length of about 1.050 inches and a thickness of about 0.450 inches. A retainer groove 208 is located between and separates the gradual taper from the tang 204 and the retainer groove 208 typically has a radius of curvature of about 2,000 inches, for example.

As shown in FIGS. 2C and 2D, the first and second boring bars 12A, 12B, incorporating the inventive aspects of the present invention, are shown and will now be briefly described. An important distinction between a conventional boring bar 12 and the first and the second boring bars 12A, 12B showing these figures, is formed in each opposed end of the first and second boring bars 12A, 12B. According to the disclosure, each opposed end of the boring bar is partially hollowed out and thus has the blind cavity or recess 206 formed therein. The blind cavity or recess 206 is typically formed or machined in each opposed end of the boring bar so as to closely and intimately receive approximately one half of the coupling member 200, but not receive the midpoint section 202 of the coupling member 200. That is, the blind cavity or recess 206 is formed or machined so as to closely conform to and receive slightly less than one half of the coupling member 200 so as to avoid a relative rotation therebetween when slightly less than one half of the coupling member 200 is received within the blind cavity or recess 206.

As generally shown in FIGS. 2C and 2D, the leading end each one of the blind cavities or holes 206, formed in the opposed ends of the boring bars 12A, 12B, is generally cylindrical in shape and also tapers, e.g., has a #4 Morse Taper, while the trailing or bottom end of the blind cavity or recess as a rectangular shaped profile which is sized and shaped to intimately receive and engage with one of the tangs 204 of the coupling member 200. As a result of this arrangement, when a first end of the coupling member 200 is inserted into and received by the blind cavity or hole 206, formed in the first end of the first boring bar 12A, and a second end of the coupling member 200 is inserted into and received by the blind cavity or hole 206, formed in the second end of a second boring bar 12B, the coupling member 200 rigidly joins the first and the second boring bars 12A, 12B, end to end, with one another along a common longitudinal axis.

Since the coupling member 200 is substantially completely received within the adjacent and facing blind cavities or recesses 206 of the first and the second boring bars 12A, 128, the coupling member 200 intimately and substantially completely fills both of the blind cavities or recesses 206 and thereby also securely couples the first and the second boring bars 12A, 12B with one another without hindering, obstructing or interfering with any axial movement and/or rotation of the interconnected first and second boring bars 12A, 12B during use. That is, the coupled first and the second boring bars 12A, 12B can substantially function and operate as a single continuous shaft without the coupling member 200 hindering, obstructing or interfering with any rotation or axial movement of the coupled first and the second boring bars 12A, 12B during operation.

As shown in FIGS. 2C and 2D, the joined first and second boring bars 12A, 12B are slightly spaced apart from one another by a small distance or gap so that only a small portion of the coupling member 200, e.g., the midpoint section 202, is visible between this gap or space. This ensures that coupling member 200 does not obstruct or extend to the exterior surface of either of the first or the second boring bars 12A, 12B and thus does not hinder or interfere with operation of any bearings or other components which are attached or interact with an exterior surface of either of the first or the second boring bars 12A, 12B.

Turning now to FIGS. 3A, 3B, 3C, 3D and 3E, a detailed description concerning a second aspect of the present disclosure will now be provided. According to this embodiment, a coupling arrangement 210 is provided for directly joining or coupling one end of a first driveline component 212 with one end of a second driveline component 214 without any additional component(s) being required in order to achieve a secure but releasable connection therebetween.

Figures 3A, 3B, 3C, 3D, 3E:
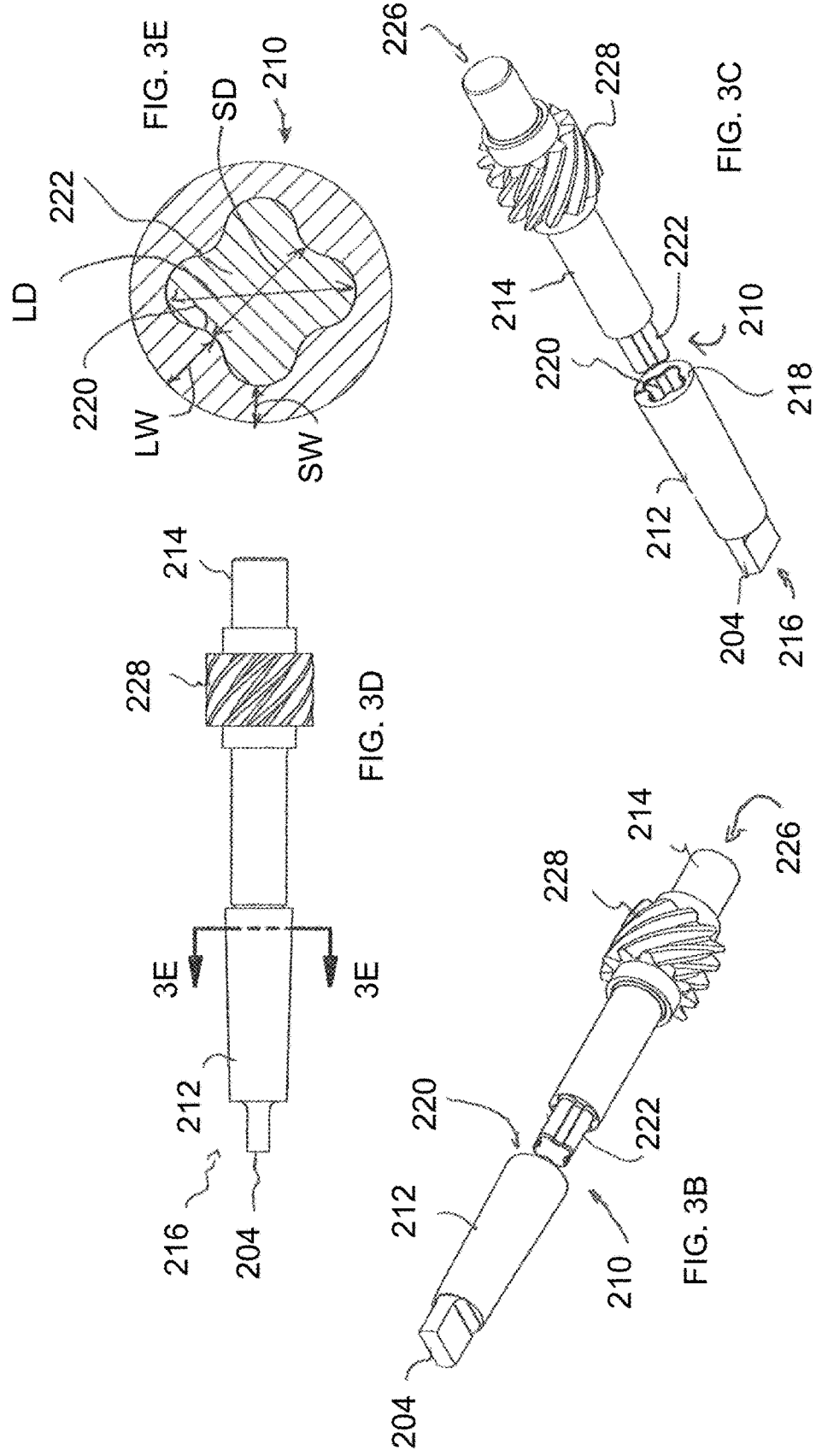
FIG. 3A is a diagrammatic front elevational view of a coupling arrangement between the first and the second driveline components with the first and the second driveline components being separated from one another.
FIG. 3B is top, left, front perspective view of the coupling arrangement of FIG. 3A.
FIG. 3C is bottom, right, front perspective view of the coupling arrangement of FIG. 3A.
FIG. 3D is a diagrammatic front elevational view of FIG. 3A showing the first and the second driveline components coupled to one another.
FIG. 3E is a diagrammatic cross-sectional view of the coupling arrangement along section line 3E-3E of FIG. 3D.

As shown in these figures, a first end 216 of the first driveline component 212 has a conventional tang 204 for matingly engaging with a tang receiving recess (not shown) provided in a drive motor (not shown), for example. As shown in FIGS. 3C and 3E, the opposite second end 218 of the first driveline component 212 has a uniquely shaped noncircular female spline connection 220, e.g., the cross-sectional shape of the female spline connection 220 is a shape other than circular. As shown in FIG. 3E, the cross-sectional shape of the female spline connection 220 is generally in the shape of a four leaf clover and somewhat resembling a plus sign with rounded ends. It is to be appreciated that the cross-sectional shape of the female spline connection 220 could have a variety of other different shapes, e.g., square, triangular, hexagonal, etc., without departing from the spirit and scope of the present disclosure. Preferably all of the surfaces of the male spline connection 222 and the female spline connection 220 are suitably rounded or contoured.

As shown in FIGS. 3A-3C and 3E, a first end 224 of the second driveline component 214 has a corresponding or mating male spline connection 222. The male spline connection 222 is shaped and sized to intimately and closely be received within and by the female spline connection 220 and thereby couple the first driveline component 212 with the second driveline component 214 without permitting any relative rotation between the first and the second driveline components 212, 214. A driveline helical pinion gear 228 is permanently affixed and connected to the second driveline component 214, adjacent a second end 226 thereof. As is conventional, the helical pinion gear 228 mates with a boring bar helical pinion gear (not shown), which is secured to the boring bar 12, 12A or 12B, in order to transfer the supplied rotational drive, from the drive motor through the first and the second driveline components 212, 214, to the boring bar 12 in order to rotate the boring bar 12 in a desired rotational direction.

The male spline connection 222 and the female spline connection 220 each have a sufficient length, thickness and mating contour so as to reliably transfer driving torque from the female spline connection 220 to the male spline connection 222 without permitting or allowing any slip or relative rotation therebetween. As shown in FIG. 3E, a ratio of the largest transverse dimension LD of the male spline connection 222 to the smallest transverse dimension SD of the male spline connection 222 is about 4:3 while a ratio of the largest transverse wall thickness LW of the female spline connection 220 to the smallest transverse wall thickness SW of the female spline connection 220 is about 2:1.

As shown in FIG. 3E, the (four) rounded and thicker sections or the largest transverse wall thickness LW of the female spline connection 220 limit the size of a cylindrical member that could possibly be received within the female spline connection 220 of the first driveline component 212. The largest transverse dimension LD of the male spline connection 222 is between 1.25 and 1.85 times larger than a diameter of a largest cylindrical member that could possibly fit within and be received by the female spline connection 220. Such arrangement ensures/prevents any slip or relative rotation between the first driveline component 212 and the second driveline component 214.

If desired, the exterior surface of the first driveline component 212 may be provided with a very small, gradual taper, e.g., a #3 Morse taper, while a mating interior surface of the drive motor is also provided with a corresponding small, gradual taper, e.g., a #3 Morse taper, to facilitate a secure but releasable connection between the first driveline component 212 and the drive motor. It is to be appreciated that a variety of other connecting linkages or arrangements could be provided between the first driveline component 212 and the drive motor 27, without departing from the spirit and scope of the present invention, but all such connecting linkages and arrangement will employ the male/female spline connection.

The female spline connection 220 typically has an axial length of about 0.75 inches while the male spline connection 222 also typically has an axial length of about 0.75. The first driveline component 212 typically has an axial length of between about 3 inches and about 9 inches, e.g., 5.56 inches, while the second driveline component 214 typically has an axial length of between about 3 inches and about 9 inches, e.g., 5.56 inches. The helical pinion gear 228 typically has an axial length of about 1 inch and normally contains 11 helical teeth.

Turning now to FIGS. 4A, 4B and 4C, a detailed description concerning a third aspect of the present disclosure will now be provided. According to this aspect, the feed screw assembly 26 comprises both a feed screw support shaft 230, which is generally accommodated or rotatably supported by the gearbox 25, and a feed screw shaft 232. As shown, the feed screw support shaft 230 has a through bore 234 which extends completely through the feed screw support shaft 230 along the entire longitudinal length thereof from a first end to a second end thereof. The through bore 234 is sized to receive an elongate threaded draw bolt 236 and a leading threaded end is inserted into the first end of the through bore 234 of the feed screw support shaft 230. The second end of through bore 234 has a locating/alignment internal taper 238 which is designed to receive and mate with an external taper 240 carried by a first end of a desired one of the feed screw shafts 232 and thereby facilitate alignment of the two shafts 230, 232 with one another along a common axis. As discussed above, the external taper 240 is designed to engage and mate with the internal taper 238 of the feed screw support shaft 230 and thereby form the feed screw assembly 26.

A blind threaded bore 242 is formed within the first end of each one of the feed screw shafts 232. This threaded bore 242 is sized to threadedly engage with the leading threaded end of the draw bolt 236 and facilitate releasable connection of the feed screw shaft 232 with the feed screw support shaft 230, when the threaded draw bolt 236 is tightened, and facilitate separation of the feed screw shaft 232 from the feed screw support shaft 230, when the threaded draw bolt 236 is loosened and removed. It is to be appreciated that the mating tapers 238, 240 of the feed screw support shaft 230 and the feed screw shaft 232 must each have a sufficient axial length in order to ensure proper axial alignment of the two shafts 230, 232 with one another along a longitudinal axis of the feed screw assembly 26 once the drawing bolt 236 is sufficiently tightened so as to interconnect the two shafts 230, 232 with one another.

The exterior surface of the second end of the feed screw support shaft 230, which carries the internal taper 238, has an annular ramp or tapering annular surface, e.g., a disengagement taper 246, which has a gradually reducing diameter immediately adjacent the second end of the feed screw support shaft 230 facing the feed screw support shaft 230. The disengagement taper 246, of the feed screw support shaft 230, is designed so that when a threaded half nut section 37' (discussed below in further detail) engages with the disengagement taper 246, the disengagement taper 246 will gradually force or bias the threaded half nut section 37' out of engagement with the threaded section 33 of the feed screw assembly 26 and thereby prevent further feeding of the boring bar 12 by the feed screw assembly 26, the purpose of which will become apparent from the following description.

The threaded portion 33, which interconnects with one of the feed screw shafts 232, typically has a ¾-10 acme precision thread which is formed in and extends substantially along the entire exterior surface of the feed screw shaft 232. It is contemplated that there will be, for example, between two and eight separate feed screw shafts 232, typically three feed screw support shafts 230, with the first feed screw shaft 232 having an axial length of about 6.0 inches, the second feed screw shaft 232 having an axial length of about 10.0 inches, and the third feed screw shaft 232 having an axial length of about 14.0 inches, for example. It is to be appreciated that there may be more or less feed screw shafts 232 and the feed screw shafts 232 can have different axially lengths than those indicated above, e.g., between 3 inches and 24 inches, without departing from the spirit and scope of the disclosure.

When replacement of the current feed screw shaft 232, as shown in FIG. 4A, with either a longer or a short feed screw shaft 232, as shown in FIG. 4C, is desired by an operator, the draw bolt 236 is first loosened and then removed from engagement with the threaded bore 242 formed in the supported feed screw shaft 232. Thereafter, the current feed screw shaft 232 can be separated from the feed screw support shaft 230 by withdrawing the first end of the feed screw shaft 232 from the locating/alignment internal taper 238 of the feed screw support shaft 230. Next, the new replacement feed screw shaft 232, having the desired longer or short axial length, is installed by inserting the external taper 240 of the replacement feed screw shaft 232 into the locating/alignment internal taper 238 of the feed screw support shaft 230. Thereafter, the leading threaded end of the draw bolt 236 threaded engages with the threaded bore 242 of the replacement feed screw shaft 232. As the draw bolt 236 is threaded into the blind threaded bore 242, the external taper 240 of the replacement feed screw shaft 232 is drawn toward the locating/alignment internal taper 238 of the feed screw support shaft 230 and to axially align and couple the replacement feed screw shaft 232 and the feed screw support shaft 230 with one another. The feed screw support shaft 230 has one or more recessed formed in the exterior surface thereof which facilitates attachment of the converter gear 56 thereto.

Turning now to FIGS. 5E and 5F, as shown therein, the threaded section 33 of the feed screw assembly 26 is coupled to the boring bar 12 by the feed coupling 28 so as to convey, upon rotation of the feed screw assembly 26 in a desired rotational direction, the boring bar 12 in a desired axial direction, along the axis R of the boring bar 12. According to this embodiment, the boring bar locking collar 30A is fixedly secured to the desired boring bar 12 to facilitate axial feeding of the boring bar 12. The split sleeve of the boring bar locking collar 30A is received within and engages with a pair of boring bar bearings 250 which are accommodated within the coupling bore 40 of the feed coupling 28 in a conventional manner.

The threaded half nut section 37' is typically formed in a first end of an elongate half nut component 252. The half nut component 252 is axially located within a feed screw bore 264 and the threaded half nut section 37' releasably threadedly engages with the threaded section 33 of the feed screw assembly 26 to facilitate axial movement of the feed coupling 28 during rotation of the feed screw assembly 26. A first collar 265 is accommodated within the feed screw bore 264, at or adjacent a first end thereof, while a second collar 265 is accommodated within the feed screw bore 264, at or adjacent a second end thereof. The first and second collars 265 provide the radially support for the feed screw assembly 26 which is accommodated within the feed screw bore 264. The threaded half nut section 37' of the elongate half nut component 252 is arranged to be selectively moved into and out of engagement with the threaded section 33 of the feed screw assembly 26 by a thread engagement/disengagement mechanism 254, and a biasing surface 256, located at the opposite end of the elongate half nut component 252.

When the thread engagement/disengagement mechanism 254 is in its engaged position, the threaded half nut section 37' of the elongate half nut component 252 engages with the threaded section 33 so that rotation of the feed screw assembly 26 induces corresponding axial movement of the feed coupling 28. However, when the thread engagement/disengagement mechanism 254 is in its disengaged position, the threaded half nut section 37' of the elongate half nut component 252 is disengaged from the threaded section 33 so that the feed coupling 28 (as well as the connected boring bar 12) can be moved or slid, by an operator, axially along to the feed screw assembly 26 to a new desired relative position. The thread engagement/disengagement mechanism 254 allows the feed coupling 28 and the connected boring bar 12 to be quickly reposition, relative to the bore 18 being serviced, in order to facilitate another machining or cutting pass through the bore 18 being serviced, for example, without requiring use of either the hand wheel 36 or the drive motor 27 to be rotated in order to reposition the feed coupling 28 and the connected boring bar 12 at another desired position for another pass through the bore 18 being serviced.

A further description concerning the thread engagement/disengagement mechanism 254 will now be provided with reference to FIGS. 5E and 5F. As shown and described above, the elongate half nut component 252 generally comprises an elongate member which has the threaded half nut section 37' formed adjacent a first end thereof and a biasing surface 256 formed adjacent a second opposite end thereof. The threaded half nut section 37' is sized and shaped to matingly engage with the threaded section 33 of the feed screw assembly 26. The threaded half nut section 37' typically comprises an acuate threaded section of about 160 degrees so as to engage with a little less than ⅓ of the thread formed on the exterior surface of the threaded section 33.

An elongate slot or channel 258 is formed along a side wall of the elongate half nut component 252 and this slot or channel 258, as discussed below in further detail, permits limited sliding movement of the elongate half nut component 252, within a blind nut bore 260, while preventing rotation of the elongate half nut component 252, within the blind nut bore 260, so that the threaded half nut section 37' constantly remains properly aligned with the threaded section 33 of the feed screw assembly 26. In addition, a cam through bore 262 extends completely through a central portion of the elongate half nut component 252, between the threaded half nut section 37' and the biasing surface 256, to assist with and control movement of the threaded half nut section 37' elongate half nut component 252 into and out of engagement with the threaded section 33 of the feed screw assembly 26, as will be discussed below in further detail.

The blind nut bore 260 is formed within the feed coupling 28 and communicates with the feed screw bore 264. The blind nut bore 260 is arranged and extends substantially normal to the feed screw assembly 26, when this assembly is received within the feed screw bore 264. A biasing spring 266 is located at a bottom of the blind nut bore 260. The elongate half nut component 252 is also accommodated within the blind nut bore 260 such that the biasing spring 266 normally biases the elongate half nut component 252 away from the bottom of the blind nut bore 260 and toward engagement with the threaded section 33 of the feed screw assembly 26, when the feed screw assembly 26 is located within the feed screw bore 264 of the feed coupling 28.

A sidewall of the feed coupling 28 has a threaded screw hole 268 which receives an alignment screw 270. The half nut alignment screw 270 is threaded into the threaded screw hole 268 extends parallel to the feed screw bore 264 and engages with the elongate slot or channel 258 formed in the side wall of the elongate half nut component 252. The engagement between the half nut alignment screw 270 and the elongate slot or channel 258 permits limited to and fro sliding movement of the elongate half nut component 252 within the feed screw bore 264 while preventing relative rotation of the elongate half nut component 252 with respect to the blind nut bore 260.

A cam through bore 272 also extends completely through both opposed sidewalls of the feed coupling 28, generally normal to the feed screw bore 264'. The cam through bore 272 is located between the feed screw bore 264 and the coupling bore 40. An engagement/disengagement cam 274 is accommodated within and passes completely through both of the cam through bores 262, 272. Each opposed end of the engagement/disengagement cam 274 has an annular recesses formed therein which accommodates a locking ring 276 which maintains the engagement/disengagement cam 274 properly positioned within both the cam through bores 272, 262 while still permitting rotation of the engagement/disengagement cam 274 relative to both the feed coupling 28 and the elongate half nut component 252. Since the engagement/disengagement cam 274 extends through the cam through bore 262, these components prevent the elongate half nut component 252 from being inadvertently forced out of the blind nut bore 260 by the biasing spring 266 when the feed screw assembly 26 is not accommodated within the feed screw bore 264.

As generally shown in FIGS. 5A, 5B, 5C and 5D, the engagement/disengagement cam 274 has a flat surface or removed region 278 which permits the biasing spring 266 to bias the threaded half nut section 37' away from the bottom of the blind nut bore 260 and into engagement with the threaded section 33 of the feed screw assembly 26. However, when the engagement/disengagement cam 274 is rotating approximately 180 degrees, in either rotational direction, relative to the cam through bore 272 of the feed coupling 28, a cylindrical cam surface 280 of the engagement/disengagement cam 274 engages with the cam through bore 262 of the elongate half nut component 252 and biases the elongate half nut component 252 a small but sufficient distance toward the bottom surface of the blind nut bore 260 so that the threaded half nut section 37' thereby becomes disengaged from the threaded section 33 of the feed screw assembly 26.

The cam surface 280 of the engagement/disengagement cam 274 generally retains the threaded half nut section 37' disengaged from the threaded section 33, e.g., due to friction, until an operator again rotates the engagement/disengagement cam 274 approximately 180 degrees, in either rotational direction, relative to the cam through bore 272 of the feed coupling 28 to permit the biasing spring 266 to thereafter bias the threaded half nut section 37' of the elongate half nut component 252 away from the bottom surface of the blind nut bore 260 and into engagement with the threaded section 33 of the feed screw assembly 26.

As noted above, the exterior surface of the second end of the feed screw support shaft 230, supports the disengagement taper 246 which has a gradually reducing diameter immediately adjacent the second end of the feed screw support shaft 230. The disengagement taper 246, of the feed screw support shaft 230, when conveyed to the threaded half nut section 37' of the elongate half nut component 252, is designed to gradually disengage the threaded half nut section 37' from the threaded section 33 of the feed screw assembly 26 and thereby interrupt and prevent further feeding of the boring bar 12, 12A, 12B by the feed screw assembly 26.

As shown in FIGS. 5E and 5F, the threaded half nut section 37' of the elongate half nut component 252 is engaged with the threaded section 33 of the feed screw assembly 26 such that rotation of the feed screw assembly 26 induces the feed coupling 28 and the boring bar 12 to move toward the left of those Figures. If rotation of the feed screw assembly 26 continues until the threaded half nut section 37' of the elongate half nut component 252 commences engagement with the disengagement taper 246, the taper of the disengagement taper 246 is designed to gradually disengage the threaded half nut section 37' from the threaded section 33. That is, as the threaded half nut section 37' engages with the disengagement taper 246 and commences moving or riding along the taper of the disengagement taper 246, the threaded half nut section 37' is gradually forced away from and out of engagement with the threaded section 33, i.e., such movement forces the elongate half nut component 252 further into the blind nut bore 260, toward the bottom thereof, thereby compressing the biasing spring 266. In the event that the threaded half nut section 37' moves or rides along the entire taper of the disengagement taper 246, then the half nut 37 becomes completely disengaged from the threaded section 33 of the feed screw assembly 26 thereby prevent further any feeding of the boring bar 12 by the feed screw assembly 26.

Since certain changes may be made in the above described improved feed mechanism for feeding a boring bar, without departing from the spirit and scope of the invention herein involved, it is intended that all of the subject matter of the above description or shown in the accompanying drawings shall be interpreted merely as examples illustrating the inventive concept herein and shall not be construed as limiting the invention.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A boring bar apparatus comprising:
    a boring bar having at least one tool aperture formed therein adjacent a working end thereof for mounting a desired tool to the boring bar;
    a gearbox for connection with a drive end of the boring bar for rotating the boring bar in a desired rotational direction;
    a driveline connection for coupling a drive motor to the gearbox and supplying drive thereto for rotating the boring bar;
    an axial translation mechanism for axially indexing the boring bar, an incremental distance, during rotation of the boring bar, and the axial translation mechanism comprising:
        a feed screw assembly, extending parallel to but spaced from the boring bar, and the feed screw assembly having a threaded section, and the feed screw assembly comprising at least one feed screw shaft which is releasably engagable, via a draw bolt, with a feed screw support shaft;
        a rotational converter mechanism coupling the boring bar to the feed screw assembly for incrementally rotating the feed screw assembly during rotation of the boring bar; and
        a feed coupling having a first end engaging with the threaded section of the feed screw assembly while a second end of the feed coupling engaging with the boring bar for axially conveying the boring bar during rotation of the feed screw assembly; and
        the first end of the feed coupling having a threaded half nut section which, in an engaged first position, engages with the threaded section of the feed screw assembly to facilitate axially indexing of the boring bar, and in a disengaged second position, the threaded half nut section disengages from the threaded section of the feed screw assembly to facilitate moving both the feed coupling and the boring bar relative to the feed screw assembly to assist with repositioning of the boring bar.

2. The boring bar apparatus according to claim 1, wherein the first end of the feed coupling has a feed screw through hole and the feed screw assembly extends though the feed screw through hole while the second end of the feed coupling has a boring bar through hole and the boring bar extends though the boring bar through hole.

3. A boring bar apparatus comprising:
    a boring bar having at least one tool aperture formed therein adjacent a working end thereof for mounting a desired tool to the boring bar;
    a gearbox for connection with a drive end of the boring bar for rotating the boring bar in a desired rotational direction;
    a driveline connection for coupling a drive motor to the gearbox and supplying drive thereto for rotating the boring bar;
    an axial translation mechanism for axially indexing the boring bar, an incremental distance, during rotation of the boring bar, and the axial translation mechanism comprising:
        a feed screw assembly, extending parallel to but spaced from the boring bar and the feed screw assembly having a threaded section;
        a rotational converter mechanism coupling the boring bar to the feed screw assembly for incrementally rotating the feed screw assembly during rotation of the boring bar; and
        a feed coupling having a first end engaging with the threaded section of the feed screw assembly while a second end of the feed coupling engaging with the boring bar for axially conveying the boring bar during rotation of the feed screw assembly;
        the first end of the feed coupling having a threaded half nut section which, in an engaged first position, engages with the threaded section of the feed screw assembly to facilitate axially indexing of the boring bar, and in a disengaged second position, the threaded half nut section disengages from the threaded section of the feed screw assembly to facilitate moving both the feed coupling and the boring bar relative to the feed screw assembly to assist with repositioning of the boring bar;
        the first end of the feed coupling has a feed screw through hole and the feed screw assembly extends though the feed screw bore while the second end of the feed coupling has a boring bar through hole and the boring bar extends though the boring bar through hole; and
        the threaded half nut section is supported by an elongate half nut component, and the elongate half nut component is accommodated within a blind nut bore formed in the feed coupling, and the blind nut bore extends normal to the feed screw through hole to facilitate engagement and disengagement of the threaded half nut section with the threaded section of the feed screw assembly during use.

4. The boring bar apparatus according to claim 3, wherein the elongate half nut component is an elongate member which has the threaded half nut section at a first end thereof and a biasing surface formed adjacent a second opposite end thereof, and a biasing spring is located adjacent a bottom of the blind nut bore for biasing the threaded half nut section into the first position in engagement with the threaded section of the feed screw assembly.

5. The boring bar apparatus according to claim 3, wherein a cam through bore extends completely through both the feed coupling and a central portion of the elongate half nut component, and an engagement/disengagement cam is accommodated within and passes completely through the cam through bores for controlling movement of the elongate half nut component into and out of engagement with the threaded section of the feed screw assembly.

6. The boring bar apparatus according to claim 5, wherein the engagement/disengagement cam has a recessed area which permits a biasing spring to bias the threaded half nut section away from a bottom of the blind nut bore and into engagement with the threaded section of the feed screw assembly.

7. The boring bar apparatus according to claim 5, wherein an elongate channel is formed along a side wall of the elongate half nut component and a threaded half nut alignment screw engages with the elongate channel so as to permit limited sliding movement of the elongate half nut component, within the blind nut bore, while preventing rotation of the elongate half nut component relative to the blind nut bore so that the threaded half nut section constantly remains properly aligned with the threaded section of the feed screw assembly.

8. The boring bar apparatus according to claim 5, wherein a first collar is accommodated within the feed screw through hole, adjacent a first end thereof, while a second collar is accommodated within the feed screw through hole, adjacent a second end thereof, and the first and the second collars provide radially support for the feed screw assembly accommodated within the feed screw through hole.

9. The boring bar apparatus according to claim 1, wherein a locking collar is fixedly secured to the boring bar to facilitate axial feeding of the boring bar, and the locking collar is received within a coupling bore of the feed coupling and engages with at least one boring bar bearing which facilitates rotation of the boring bar and the locking collar relative to the feed coupling.

10. The boring bar apparatus according to claim 1, wherein the feed screw support shaft has a through bore which extends completely through the feed screw support shaft, the through bore receives the draw bolt while a second end of the through bore has a locating/alignment internal taper which is designed to receive an external taper of the feed screw shaft and facilitate axial alignment of the feed screw shaft and the feed screw support shaft with one another along a common axis.

11. The boring bar apparatus according to claim 1, wherein an exterior surface of a second end of the feed screw support shaft, which has an internal taper, has an external tapered annular surface which gradually reduces in diameter immediately adjacent the second end of the feed screw support shaft facing the feed screw shaft and is designed to automatically disengage the threaded half nut section from the threaded section of the feed screw assembly and prevent further feeding of the boring bar by the feed screw assembly.

12. The boring bar apparatus according to claim 1, wherein the feed screw shaft has an exterior thread and has an axial length of between about 3.0 inches and about 24.0 inches.

13. The boring bar apparatus according to claim 1, wherein the boring bar apparatus includes a plurality of separate and replaceable feed screw shafts which are each separately engagable with the feed screw support shaft.

14. The boring bar apparatus according to claim 1, wherein the drive line connection comprises a first driveline component which has a first end for matingly engaging with the drive motor and a second end which has a noncircular female spline connection, a first end of a second driveline component has a corresponding noncircular male spline connection which is matingly received within the female spline connection and thereby couple the first driveline component with the second driveline component without permitting any relative rotation between the first and the second driveline components.

15. The boring bar apparatus according to claim 14, wherein a driveline helical pinion gear is permanently affixed to the second driveline component, adjacent a second end thereof, and the helical pinion gear is coupled to drive the boring bar.

16. The boring bar apparatus according to claim 14, wherein the male spline connection and the female spline connection each have a sufficient length and thickness so as to reliably transfer driving torque from the female spline connection to the male spline connection without permitting any relative rotation therebetween, and a ratio of a largest transverse cross sectional dimension of the male spline connection to a smallest transverse cross sectional dimension of the male spline connection is about 4:3 while a ratio of a largest transverse cross sectional wall thickness of the female spline connection to a smallest transverse cross sectional wall thickness of the female spline connection is about 2:1.

17. The boring bar apparatus according to claim 1, wherein an exterior surface of a first driveline component is provided with a gradual taper while a mating interior surface of the drive motor is provided with a corresponding gradual taper to facilitate a secure but releasable connection between the first driveline component and the drive motor.

18. A boring bar apparatus comprising:
a boring bar having at least one tool aperture formed therein adjacent a working end thereof for mounting a desired tool to the boring bar;
a gearbox for connection with a drive end of the boring bar for rotating the boring bar in a desired rotational direction;
a driveline connection for coupling a drive motor to the gearbox and supplying drive thereto for rotating the boring bar;
an axial translation mechanism for axially indexing the boring bar, an incremental distance, during rotation of the boring bar, and the axial translation mechanism comprising:
a feed screw assembly, extending parallel to but spaced from the boring bar and the feed screw assembly having a threaded section;
a rotational converter mechanism coupling the boring bar to the feed screw assembly for incrementally rotating the feed screw assembly during rotation of the boring bar; and
a feed coupling having a first end engaging with the threaded section of the feed screw assembly while a second end of the feed coupling engaging with the boring bar for axially conveying the boring bar during rotation of the feed screw assembly;

the first end of the feed coupling having a threaded half nut section which, in an engaged first position, engages with the threaded section of the feed screw assembly to facilitate axially indexing of the boring bar, and in a disengaged second position, the threaded half nut section disengages from the threaded section of the feed screw assembly to facilitate moving both the feed coupling and the boring bar relative to the feed screw assembly to assist with repositioning of the boring bar; and the first end of the feed coupling has a feed screw through hole and the feed screw assembly extends though the feed screw bore while the second end of the feed coupling has a boring bar through hole and the boring bar extends though the boring bar through hole;

wherein the boring bar is formed by at least first and second boring bars which are coupled together by a coupling member, the coupling member has a tang located at each opposed end thereof and a gradually taper on either side of a midpoint section of the coupling member, and at least one end of each of the first and the second boring bars is partially hollowed out to form a blind recess which matingly receives approximately one half of the coupling member so as to connected the first and the second boring bars to one another and prevent relative rotation therebetween when a portion of the coupling member is received within adjacent blind cavities of the first and the second boring bars.

19. The boring bar apparatus according to claim 18, wherein the first and the second boring bars, when connected to one another by the coupling member, are spaced apart from one another by a gap so that only the midpoint section of the coupling member is visible between the gap.

* * * * *